(12) United States Patent
Posegga et al.

(10) Patent No.: US 7,181,725 B1
(45) Date of Patent: Feb. 20, 2007

(54) METHOD FOR VERIFYING SAFETY PROPERTIES OF JAVA BYTE CODE PROGRAMS

(75) Inventors: Joachim Posegga, Bruchsal (DE); Harald Vogt, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/720,616

(22) PCT Filed: Jun. 25, 1999

(86) PCT No.: PCT/EP99/04438

§ 371 (c)(1),
(2), (4) Date: Dec. 26, 2000

(87) PCT Pub. No.: WO00/00890

PCT Pub. Date: Jan. 6, 2000

(30) Foreign Application Priority Data

Jun. 26, 1998 (DE) ................. 198 30 015

(51) Int. Cl.
G06F 9/44 (2006.01)
G06F 9/45 (2006.01)

(52) U.S. Cl. .................. 717/118; 717/108; 717/116

(58) Field of Classification Search ........ 717/114–118, 717/126, 127, 128, 147, 148, 108
See application file for complete search history.

(56) References Cited

U.S. PATENT DOCUMENTS

| | | | | |
|---|---|---|---|---|
| 5,615,137 A | * | 3/1997 | Holzmann et al. | 703/17 |
| 6,110,226 A | * | 8/2000 | Bothner | 717/153 |
| 6,151,703 A | * | 11/2000 | Crelier | 717/136 |
| 6,170,083 B1 | * | 1/2001 | Adl-Tabatabai | 717/158 |
| 6,289,502 B1 | * | 9/2001 | Garland et al. | 717/104 |
| 6,353,896 B1 | * | 3/2002 | Holzmann et al. | 714/38 |
| 6,481,006 B1 | * | 11/2002 | Blandy et al. | 717/139 |
| 6,578,020 B1 | * | 6/2003 | Nguyen | 706/15 |
| 6,651,186 B1 | * | 11/2003 | Schwabe | 714/38 |
| 6,691,306 B1 | * | 2/2004 | Cohen et al. | 717/139 |

(Continued)

FOREIGN PATENT DOCUMENTS

EP    0 685 792    12/1995

OTHER PUBLICATIONS

Knoblock et al, "Type elaboration and subtype completion for java bytecode", ACM POPL pp. 228-242, 2000.*

(Continued)

*Primary Examiner*—Anil Khatri
(74) *Attorney, Agent, or Firm*—Kenyon & Kenyon LLP

(57) ABSTRACT

In a method for verifying the safety properties of Java byte code programs, the functioning of the byte code program to be verified is modeled on a finite state transition system M, and the state space of the Java Virtual Machine (JVM) on a finite set of states in M. Once entered into a model checker, the data of finite state transition system M are compared to the data entered in the model checker as conditional set S to determine properties characterizing an acceptable byte code program. The byte code program to be checked is released for further processing only when the state transition system M fulfills all conditions of conditional set S.

2 Claims, 1 Drawing Sheet

U.S. PATENT DOCUMENTS

| | | | |
|---|---|---|---|
| 6,718,539 B1* | 4/2004 | Cohen et al. | 717/136 |
| 6,810,519 B1* | 10/2004 | Hicks | 717/166 |
| 6,883,163 B1* | 4/2005 | Schwabe | 717/126 |
| 6,981,245 B1* | 12/2005 | Schwabe | 717/126 |
| 6,986,132 B1* | 1/2006 | Schwabe | 717/168 |

OTHER PUBLICATIONS

Corett, "Constructing compact models of concurrent java programs", ACM ISSTA, pp. 1-10, 1998.*

Freund et al, "A type system for object initialization in the java bytecode languages", ACM OOPSLA, pp. 310-328, 1998.*

Dwyer et al, "Tool supported program abstraction for finite state verification", IEEE, pp. 177-187, 2001.*

Lindholm, T. et al., "The Java Virtual Machine Specification," Sun Microsystem; Addison-Wesley, 1996.

McMillan, K.L., "Symbolic Model Checking," Kluwer Academic Publishers, 1993.

* cited by examiner

METHOD FOR VERIFYING SAFETY PROPERTIES OF JAVA BYTE CODE PROGRAMS

FIELD OF THE INVENTION

The present invention relates to a method for verifying the safety properties of Java byte code programs using byte code verification.

RELATED TECHNOLOGY

Java is a programming language developed by Sun Microsystems that is translated into so-called byte code programs. Although originally developed for Java, byte code is suited as a target language for other programming languages, and compilers (such as ADA) are already available for this purpose.

Java's unique concept is to store programs in a network where network subscribers can retrieve them and run them on one of their units. This enables, for example, units to be configured and serviced from remote locations. However, it is also interesting in the context of smart cards, since it can be used to enhance their functionality. The following properties are characteristic of byte code programs and are significant for their intended application:

Byte code programs are compact. Byte code instructions offer substantially greater functionality than, for example, computer language instructions. Concepts, such as object orientation, are modeled on Java to enable them to be directly supported.

Byte code programs can be interpreted efficiently, which makes them independent from a specific destination machine. The only requirement is an interpreter (the so-called "Java virtual machine", JVM) on the destination machine, to be able to run any desired byte code programs. The interpreter itself can be implemented in a compact form and be integrated in (virtually) every unit.

The JVM interprets a character string input as a byte code program. In the process, the JVM does not verify whether the character string is actually a byte code program. It processes the characters as byte code commands, without performing a more precise test to check for their correctness. The JVM does not verify the byte codes, since this would significantly degrade the execution speed. In principle, therefore, it is possible to interpret any string of characters as a byte code program. Thus,—given a more precise knowledge of the JVM implementation—one could even circumvent its safety mechanisms and spy out data on the computer running the program. On the other hand, because of the language design, a secure byte code program can only access data and resources of the destination computer by calling upon functions of the JVM for that purpose.

To prevent character strings from being processed, which do not constitute permissible (safe) byte code programs, a process, the so-called byte code verification, is added. It tests the character string to see if it conforms with certain requirements. These requirements ensure that a character sequence is a safe byte code program. Since this verification only needs to be done once, the run time is not adversely affected with respect to the execution speed. The byte code verification process tests a string of characters to check whether it constitutes a permissible byte code program and, thus, poses no danger to the integrity of the unit running the program and can, thus, be transferred to the JVM for interpretation (see T. Lindholm, F. Yellin, "The Java Virtual Machine Specification"; Sun Microsystems; Addison-Wesley, 1996, which is hereby incorporated by reference herein).

A permissible byte code program is characterized by certain properties, which are described as "structural constraints" in T. Lindholm, F. Yellin: "The Java Virtual Machine Specification", Sun Microsystems, 1996, which is hereby incorporated by reference herein. For the most part, they describe the safety, with respect to type, of a byte code program. This means that, in a byte code program, the instructions are arranged in such a way that an instruction always receives those data as parameters that correspond, in type, to that which is expected of the instruction. These properties ensure that the byte code program remains under the control of the JVM and cannot directly access computer resources.

The byte code verification process is described by two actualities: first by the description of the properties that it is supposed to guarantee for a byte code program; secondly by the implementation of the process (in this case, a C program). Neither of the two descriptions is suited for making formal, machine calculations, and, therefore, for formally guaranteeing the safety of byte code programs.

Also known is a tool, referred to as a model checker, for verifying state transition systems (see K. L. McMillan "Symbolic Model Checking" Kluwer Academic Publishers, 1993, which is hereby incorporated by reference herein).

State transition systems make up a general model for programs that run on computers or other machines (such as the JVM). In this context, the states that the machine assumes during execution of the program and which transitions, i.e., state changes are possible.

Model checking is a technique which can only be used to verify finite state transition systems. For this purpose, a model checker examines the entire state space of the system to calculate the properties of the system. A typical application of model checkers is verifying whether a system satisfies certain properties. For this, as an input, the model checker requires a description of the system to be tested, as well as a description of the properties whose validity needs to be established in the system. Both cases have to do with formal descriptions, i.e., descriptions whose formal semantics is established, and on which mathematical calculations can, therefore, be performed.

Generally, software systems, including byte code programs, have an infinite state space. This means that the model checking method cannot be applied to byte code programs characterized by an infinite state space.

SUMMARY OF THE INVENTION

An object of the present invention is to provide a method which will ensure a high degree of security in verifying the safety properties of byte code programs.

The method according to the present invention may be applied to a byte code program containing a string of characters (bytes), each character either being interpreted as an instruction or as data (as an input for the preceding instruction). Thus, a byte code program represents a series of instructions and corresponding data. Therefore, it can also be interpreted as a description of a state transition system that transforms states of the JVM. The states of the system are identified on the basis of the states of the JVM, and the transitions are defined by the program instructions.

In accordance with the present invention, suitable mapping is used to map the state transition system described above (having a potentially infinite state space) onto a system having a finite number of states. A finite number of states is abstracted in that the system rejects all information not needed in determining whether the original byte code program is valid. This is accomplished by replacing the specific, or concrete, data values with pure, or abstract, type information. This can be done because the validity of a byte code program does not depend on specific values. In the process, however, all information needed to check the validity of the byte code program is retained. The resulting state transition system M has a finite number of states and thus fulfills the basic condition for processing in a model checker. The resulting state transition system M is entered into the model checker.

In a further step, the properties which characterize a valid byte code program, as T. Lindholm, F. Yellin describe in "The Java Virtual Machine Specification", Sun Microsystems, 1996 as "structural constraints", are formulated in a logic understood by the model checker as a specification language for the system properties. The result is a set of formulas that are transferred to the model checker as a conditional set S, to be used as a basis of comparison for state transition system M. The above procedure ensures that the formulas only relate to information that is present both in the original, potentially infinite-state system, as well as in the finite-state system derived therefrom.

The model checker is started with the inputs just described. As a result, it provides information as to whether state transition system M fulfills system properties described in the specification language as conditional set S in the form of formulas. In the process, the model checker verifies whether each condition s of conditional set S is fulfilled by state transition system M of the byte code program to be checked. If each condition is fulfilled, then it is ensured that the original byte code program is a valid program that does not threaten the safety of the computer executing the program. The byte code program is released for further computer processing.

However, if the data of the byte code program to be checked acquired in state transition system M do not fulfill the system properties described in conditional set S in the form of formulas and characterizing a byte code program, then it may be assumed that the tested byte code program can threaten the safety of the computer. The tested byte code program is not released for further processing.

BRIEF DESCRIPTION OF THE DRAWINGS

The method according to the present invention is elaborated upon in the following with reference to the drawing, in which.

DETAILED DESCRIPTION

Figure 1:
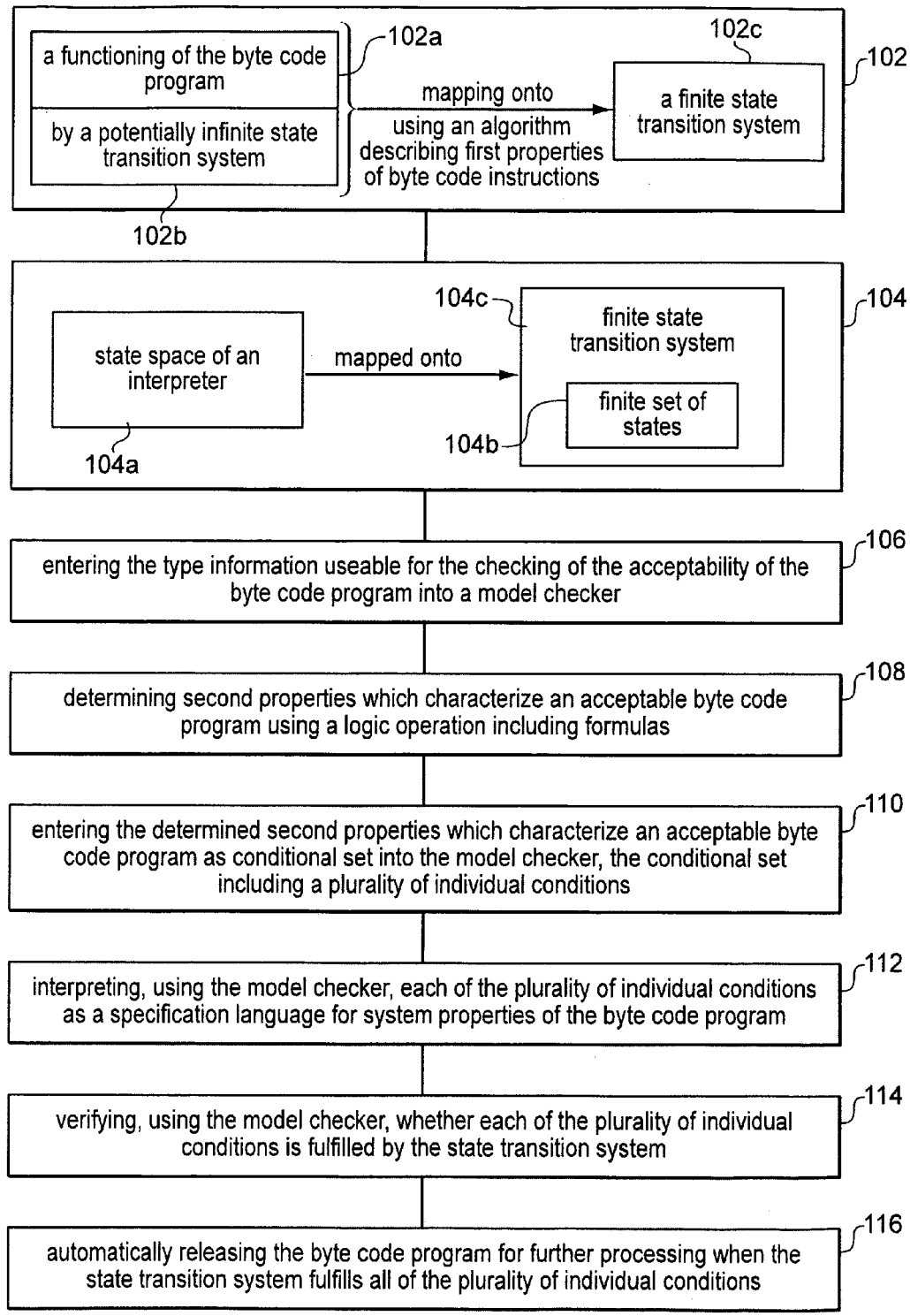
FIG. 1 shows a flow chart of a method for verifying the safety properties of Java byte code programs.

Referring to FIG. 1, the method according to the present invention maps a functioning of the byte code program (102a) by a potentially infinite state transition system (102b) onto a finite state transition system (102c) using an algorithm describing first properties of byte code instructions (block 102). A state space (104a) of an interpreter is mapped onto a finite set of states (104b) in the finite state transition system (104c), information not needed for a checking of an acceptability of the byte code program being omitted, so that the finite state transition system contains only type information useable for the checking of the acceptability of the byte code program (block 104). The type information useable for the checking of the acceptability of the byte code program is entered into a model checker (block 106). Second properties which characterize an acceptable byte code program are determined using a logic operation including formulas (block 108). The determined second properties which characterize an acceptable byte code program are entered as conditional set into the model checker, the conditional set including a plurality of individual conditions (block 110). Using the model checker, each of the plurality of individual conditions is interpreted as a specification language for system properties of the byte code program (block 112). Using the model checker, whether each of the plurality of individual conditions is fulfilled by the state transition system is verified (block 114). Then, the byte code program is automatically released for further processing when the state transition system fulfills all of the plurality of individual conditions (see block 116).

A purpose of a "byte code verification" is to check a class data file, thus the unit in which a Java class description is summarized, to verify that it can be safely executed. For this, the individual methods of the class (referred to here as byte code programs) are individually released and subjected to the actual byte code verification.

A class data file contains additional data, basically constants, which are referred to in the byte code programs. For the subsequent steps, it is advantageous to resolve, or sort out, these references in the byte code programs and incorporate them in the programs before beginning with the actual verification process.

This preprocessing provides one with a description of the byte code programs, which does not differ substantially from the original form.

The JVM, the standard interpreter for byte code programs, is described by an abstract machine, i.e., by a set of states. The execution of a byte code program corresponds to the interpretation of byte code instructions by, or on the basis of, state transitions. In this context, a byte code instruction effectively transforms the active state of the JVM into a new state.

Thus, a byte code program defines a state transition system, the state space being set by the JVM and the transitions being defined by the instructions of the byte code program. This state transition system has a potentially infinite state space. Therefore, it is not suited for verification by a model checker. For that, it is mapped onto a finite state transition system M. This mapping process is described in the following.

One does not first construct an infinite transition system that is subsequently mapped onto a finite transition system. Rather, a finite state transition system M is constructed directly from the byte code program, using rules which describe the properties of the byte code instructions.

The functioning of a byte code program is mapped onto a finite state transition system M. The state space of the JVM is mapped onto a finite set of states in state transition system M. The byte code instructions then effect transitions on this finite state quantity, its principal effect being retained. State transition system M is described in a way that allows the description to be used as an input for the model checker.

The input for the model checker has two parts:
1. A system description, designated as state transition system M, including
   a description of the state space, defined by the state variables and their domains;
   a provision specifying the start states of the system;
   a transition relation indicating how states are transformed and under which conditions.

2. A set of specifications designated as conditional set S, describing the desired properties of a permissible byte code program. These properties are required by state transition system M, which is described by the byte code program. Thus, safety can be ensured when executing the byte code program. These properties are valid in the specific, infinite state transition system (and thus in the original byte code program) when they are valid in the abstract, finite state transition system M. The model checker verifies whether they are valid in the abstract state transition system M. If they are valid, then it can be inferred that the properties are also fulfilled by specific system and, thus, in the original program.

The following describes the generation of the required data:

The state space of state transition system M is constructed of the following components:
- an instruction counter;
- an operand stack, which records the parameters and results of instructions;
- a field of local variables;
- a field of global variables;
- variables for keeping bookkeeping information; one can refer to this to describe system properties which cannot be described by the remaining components. This includes, inter alia:
- a stack, which contains information on the active subroutines (subroutines in a byte code program).

The values of variables and stack elements are derived from finite domains. The instruction counter can assume a finite number of address values. The operand stack is limited in magnitude. Overall, therefore, the state space of M is finite.

The instruction directory V contains descriptions of all byte code instructions, including the following information for each instruction:
- the description of the instruction (1 byte)
- the number of parameters in bytes (characters)
- a description of the effect on states of the JVM
- conditions, which must be met by a state of the JVM, so that the instruction can be applied (C1)
- conditions (C2) which must be met by the JVM because the instruction occurs in the program. These conditions do not necessarily relate to individual states, but also to execution paths, i.e., a series of states.

For the conditions in V, the following property (A1) applies: the description of the conditions in instruction directory V uses only those symbols used in the description of the state space for M.

From a byte code program, a compiler generates a finite state transition system. The byte code program exists as a string of characters in the input, it being possible for an individual character to be interpreted as an instruction or parameter of an instruction. The first character is interpreted as an instruction.

The goal of the compilation is to construct a state transition system M and a conditional set S. The compilation process is described as follows:
1. Start with an initial ("empty") transition system M. The state space of M is already defined by the abstract representation of the JVM state space. However, the start state of the JVM defines the start state of M. However, no transitions between the states are defined yet.
2. Start with an empty conditional set S.
3. As long as characters are present in the input, implement the following steps 4 through 8:
4. Read a character from the input; this describes program instruction B.
5. Look up in the instruction directory V to check which parameters B requires.
6. Read the parameters P required for B from the input.
7. Transfer (B,P) to the abstraction component.
8. Transfer (B,P) to the conditional component.

From an instruction B and corresponding parameters P, the abstraction component produces a set of state transitions. State transition system M is expanded by these transitions.
1. Look up in the instruction directory V to determine what effect B has on a state of the JVM. The effect is described by a rule so that the follow-up state of the JVM results from a calculation made on the active state. (An explicit indication of the possible transitions is not possible since the JVM has a (virtually) infinite state space.)
2. From this, derive a description of the effect on states of M under consideration of P. The parameters P enter into the calculation of the follow-up state. If a JVM rule is applied to an M state, then a set of M states which represent the possible follow-up states of the JVM is obtained. This yields a set of follow-up states for M since it is not the specific values in P, but rather only the information relevant for M that is considered. Which JVM follow-up state is actually assumed when the byte code program is executed depends on the specific values in P.
3. This description defines a set number of state transitions; M expanded by these transitions. These transitions can be described by a rule or be explicitly specified. The latter is possible since M only knows a finite number of states and, therefore, all transitions can be specified by state pairs. Ultimately, the description follows that which is understood by the model checker being used. For practical reasons, one explicitly avoids specifying all transitions since the data set for this is substantially greater than in the case of implicit specification on the basis of rules.

From (B,P), the conditional component produces a set of conditions which are ultimately to be verified by the model checker. The conditions can be represented in different ways, for instance by time-logic formulas.
1. Look up in the instruction directory V to determine which conditions C1 are stipulated for the active JVM state so that B can be executed.
2. Transfer C1 to corresponding M-conditions. In accordance with (A1), the conditions in V and the state description for M are adjusted to one another in such a way that C1 can be interpreted for M-states. The transfer to M essentially includes using P to produce specific instances of C1, and translating them into a logic formula.
3. Look up accordingly the conditions C2 which arise for the entire system M through the use of B.
4. Transfer accordingly C2 to M.
5. Expand the conditional set S by the representations for C1 and C2.

The described construction of state transition system M and of conditional set S for a byte code program to be verified proceeds automatically. The instruction directory V and its components are established one time, in the same way as the state space of M, for the specific purpose of the "byte code verification", i.e., of the verification of safety properties of byte code programs.

The method of operation of the model checker is explained in the following. For each condition s from conditional set S, the model checker verifies if it is fulfilled by state transition system M. If a condition s is not fulfilled, the model checker generates information that can be used together with the knowledge of the instruction for which s was produced, to analyze how the conditions for a secure execution of the JVM can be violated by the byte code program. A typical output of the model checker is made up of the indication of an execution path, i.e., of a sequence of M-states, which leads to a violation of certain conditions.

A precise analysis of the execution path is not needed. The aim of the byte code verification is merely to establish whether or not the program can violate the conditions. Information pertaining to how a violation can take place may be interesting, but is not needed, since it is merely necessary to reject potentially unsafe programs. In the process, one has to accept the fact that safe programs will also be rejected, which do, in fact, violate conditions, but, when more thoroughly analyzed, would reveal that in an actual environment, they would not be able to cause damage. Since programs of this kind are not generally developed by compilers, but rather only by deliberate encoding, significant restrictions are not being made in this case.

Controlling the byte code verification lies in coordinating the various components. A class data set is subjected to the byte code verification, in that 1. the byte code programs (methods) are released individually;
2. the references in the byte code program are resolved (pre-processing);
3. a state system and a conditional set are constructed;
4. the model checker is started with this input;
5. given success of the model checker, it is repeated for the next byte code program; in the case of failure, it is reported that the byte code verification for the class data set being analyzed has failed.

The method in accordance with the present invention may be expanded by a few points. Which properties can be verified depends on the manner in which a byte code program is mapped onto a finite state system. To establish, for instance, the acceptability of a byte code program, the mapping outlined above may be used. By selecting another abstraction mapping, other properties may be verified. An useful property would be, for instance, restricting to a certain extent the consumption of resources by a byte code program. Through the method of the present invention, the byte code verification concept that is critical to safety can be implemented on a formal basis. In this manner, a high level of safety may be attained for this aspect of Java technology. It may be expected that, above and beyond that, the technique can also be used to verify more far-reaching properties of Applets, making a larger range of applications interesting.

This technique may be applied in the environment of Java-capable smart cards (Java-capable meaning the ability to execute byte code programs) where the safety requirements are especially stringent. Java-capable smart cards make it possible to load and execute programs and, in fact, even when they are already in the possession of the end customer (this is not possible or only possible to a limited extent when conventional smart cards are used). In this context, it is important that only those programs are loaded and executed which do not violate the integrity of the card and the data stored thereon, since misusing such data can cause considerable personal or financial damage.

The safety of byte code programs may be guaranteed by using the described technique, and a certain functionality can be assured through additional upgrades. This provides greater confidence in applications designed to be run on platforms that are critical to safety, such as smart cards.

What is claimed is:

1. A method for verifying safety properties of a Java byte code program, the method comprising:

mapping a functioning of the byte code program by a potentially infinite state transition system onto a finite state transition system using an algorithm describing first properties of byte code instructions, mapping a state space of an interpreter onto a finite set of states in the finite state transition system, information not needed for a checking of an acceptability of the byte code program being omitted, so that the finite state transition system contains only type information useable for the checking of the acceptability of the byte code program;

entering the type information useable for the checking of the acceptability of the byte code program into a model checker;

determining second properties which characterize an acceptable byte code program using a logic operation including formulas;

entering the determined second properties which characterize an acceptable byte code program as conditional set into the model checker, the conditional set including a plurality of individual conditions;

interpreting, using the model checker, each individual condition of the plurality of individual conditions as a specification language for system properties of the byte code program;

verifying, using the model checker, whether each individual condition of the plurality of individual conditions is fulfilled by the state transition system; and then automatically releasing the byte code program for further processing when the state transition system fulfills all individual conditions of the plurality of individual conditions.

2. The method as recited in claim 1 wherein the interpreter is a java virtual machine.

* * * * *